C. B. PATCH.
FRICTION GEAR.
APPLICATION FILED SEPT. 27, 1916.
1,278,378.
Patented Sept. 10, 1918.
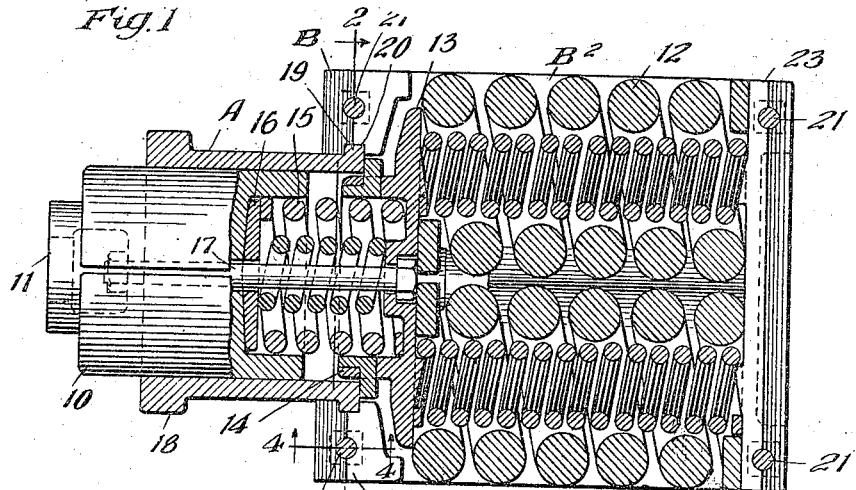
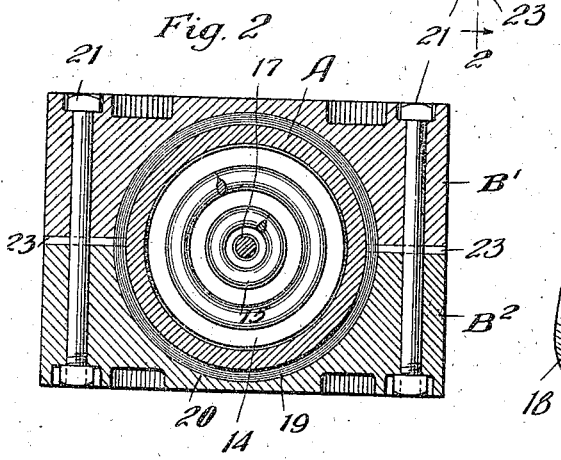
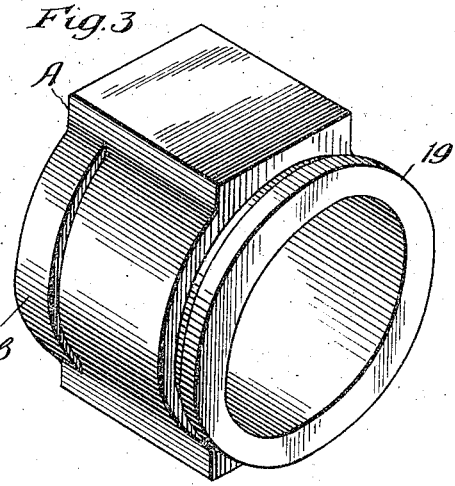
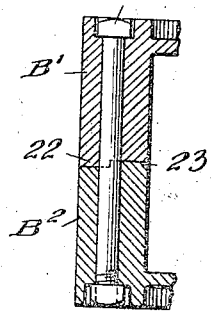
WITNESSES:
Wm. Geiger
Goldie A. Bishop
INVENTOR.
Calvin B. Patch
BY George I. Haight
His ATTORNEY

UNITED STATES PATENT OFFICE.

CALVIN B. PATCH, OF GLENELLYN, ILLINOIS, ASSIGNOR TO WILLIAM H. MINER, OF CHAZY, NEW YORK.

FRICTION-GEAR.

1,278,378.    Specification of Letters Patent.    Patented Sept. 10, 1918.

Application filed September 27, 1916. Serial No. 122,322.

*To all whom it may concern:*

Be it known that I, CALVIN B. PATCH, a citizen of the United States, residing at Glenellyn, in the county of Dupage and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

The object of the invention is to provide a combined friction shell and spring cage for friction draft gears so designed that the friction shell proper may be readily renewed or replaced at any time.

Another and more specific object of the invention is to provide a combined friction shell and spring cage of the type above indicated wherein the parts are so united as to prevent any relative movement between the friction shell proper and the spring cage to thereby prevent chattering or rattling of the parts and thus eliminate wear.

In the drawing forming a part of this specification, Figure 1 is a part sectional view, part plan of a friction shell and spring cage embodying my invention. Fig. 2 is a transverse sectional view of the structure illustrated in Fig. 1 and taken on the line 2—2 thereof. Fig. 3 is a perspective view of the friction shell proper. And Fig. 4 is a detail section taken substantially on the line 4—4 of Fig. 1.

In said drawing, A denotes the friction shell proper and B the spring cage associated therewith. The shell and cage are formed and united as hereinafter described so as to form a rigid structure and cooperable with the friction shell are friction shoes 10 and wedge 11. Within the cage B are twin arranged springs 12—12 seated at their forward end against a follower 13, the latter having an annular flange 14 extending and sliding within the shell A. Interposed between the follower 13 and the shoes 10 is a preliminary compression spring 15, the latter at its front end bearing against a washer 16 that in turn bears directly against the shoes. The friction elements and preliminary spring are held in assembled relation by means of a bolt 17, one end of which is seated in the wedge 11 and the other against the follower 13.

The shell A is shown as in the form of a cylindrical member with an outwardly extending annular flange 18 at its front end to strengthen the mouth of the shell, and with another outwardly extending annular flange 19 at its rear end. The spring cage B is shown as formed in sections B¹, B², the section line being in a horizontally extending plane. The sections B¹, B², when assembled, provide an annular grooove 20 near the front end thereof within which is adapted to be snugly received the annular flange 19, it being apparent that the two sections B¹, B² are clamped over the inner end of the friction shell A. In order to maintain the sections B¹, B² together, I provide any suitable tightening means such as the four bolts 21—21 located near the four corners of the cage. In order to prevent relative longitudinal movement between the sections B¹, B², the same are provided with cooperating transversely extending shoulders 22—23 (see Fig. 4). It will be noted that the shoulders 22 and 23 are oppositely arranged at the ends of the sections B¹, B², thus positively preventing relative longitudinal movement.

From the preceding description, it will be seen that the parts may be readily assembled and when assembled, form an extremely rigid structure positively preventing any relative movement between the various parts and thus eliminating wear which might otherwise occur from chattering of the parts. It will also be noted that the friction shell proper is formed in one piece and thus may readily be made of sufficient strength to withstand the enormous strains imposed upon it and no dependence is placed upon any bolts or other tying elements in resisting the radial pressure of the friction elements.

I claim:

1. As an article of manufacture, a combined friction shell and spring cage, the shell being separate and detachable without destructive effort from the spring cage, the shell and cage having cooperating means to lock the same together against relative movement.

2. As an article of manufacture, a friction shell and a two part spring cage, the shell and cage having cooperating means to lock the same together against relative movement.

3. As an article of manufacture, a combined friction shell and spring cage, the shell being separate from the cage and the cage comprising two sections having portions thereof fitting over and adapted to clamp the shell therebetween.

4. As an article of manufacture, a combined friction shell and spring cage, the shell being separate from the cage, the cage comprising two separable members, the shell having an annular flange at its inner end and the cage being provided with an annular groove to receive said flange.

5. As an article of manufacture, a combined friction shell and spring cage, the shell being separate from the cage, the cage comprising two separable members, the shell having an annular flange at its inner end and the cage being provided with an annular groove to receive said flange, the sections of the cage being provided with integral means preventing relative longitudinal movement therebetween when the parts are assembled.

6. As an article of manufacture, a combined friction shell and spring cage, the shell being separate from the cage, the cage comprising two separable members, the shell having an annular flange at its inner end and the cage being provided with an annular groove to receive said flange, and a series of bolts extending through the cage sections and adapted to hold the same together.

In witness that I claim the foregoing I have hereunto subscribed my name this 25th day of Sept., 1916.

CALVIN B. PATCH.

Witnesses:
GOLDIE A. BISHOP,
CLAIRE M. CUNNINGHAM